United States Patent [19]

Seggio

[11] 4,244,412
[45] Jan. 13, 1981

[54] ANTI-SKID DEVICE FOR VEHICLE WHEELS

[76] Inventor: Gianfranco Seggio, 7, Via Tracia, Milan, Italy

[21] Appl. No.: 26,408

[22] Filed: Apr. 2, 1979

[30] Foreign Application Priority Data

Apr. 7, 1978 [IT] Italy ............................... 21416/78[U]

[51] Int. Cl.³ .............................................. B60C 27/00
[52] U.S. Cl. ................................. 152/218; 192/225 C; 192/228
[58] Field of Search ............... 192/213 R, 213 A, 214, 192/216, 218, 221, 225 R X, 225 C, 220, 226, 227–230; 238/14

[56] References Cited

U.S. PATENT DOCUMENTS

| | | |
|---|---|---|
| 1,287,512 | 12/1918 | Swanson ........................... 152/225 R |
| 1,295,294 | 2/1919 | Fink ..................................... 152/228 |
| 1,308,153 | 7/1919 | Wheat ........................... 152/225 R X |
| 2,580,272 | 12/1951 | Bell ..................................... 152/221 |
| 2,953,182 | 9/1960 | Brown ....................... 152/225 C UX |
| 3,273,620 | 9/1966 | Phillips et al. ........................ 152/228 |
| 4,098,313 | 7/1978 | Ingerson ....................... 152/225 R X |

Primary Examiner—John T. Goolkasian
Assistant Examiner—Thomas E. Bokan
Attorney, Agent, or Firm—Lerner, David, Littenberg & Samuel

[57] ABSTRACT

The invention relates to an anti-skid device for vehicle wheels, formed by a plurality of U-shaped elements adapted to radially fit on the wheel tire and rim, said elements being connected with one another by spacers allowing the device to be put flat on the ground and to be automatically mounted on the wheel by simply advancing said wheel on the device.

10 Claims, 5 Drawing Figures

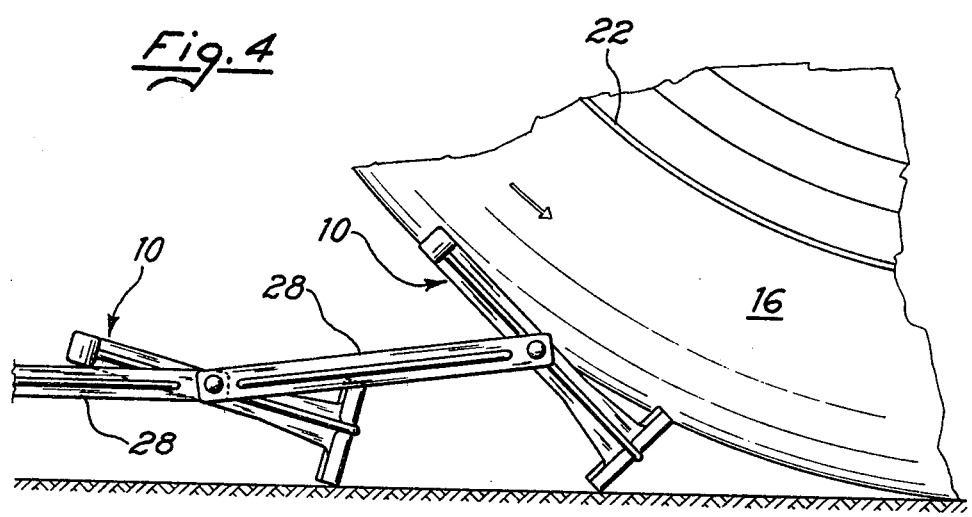
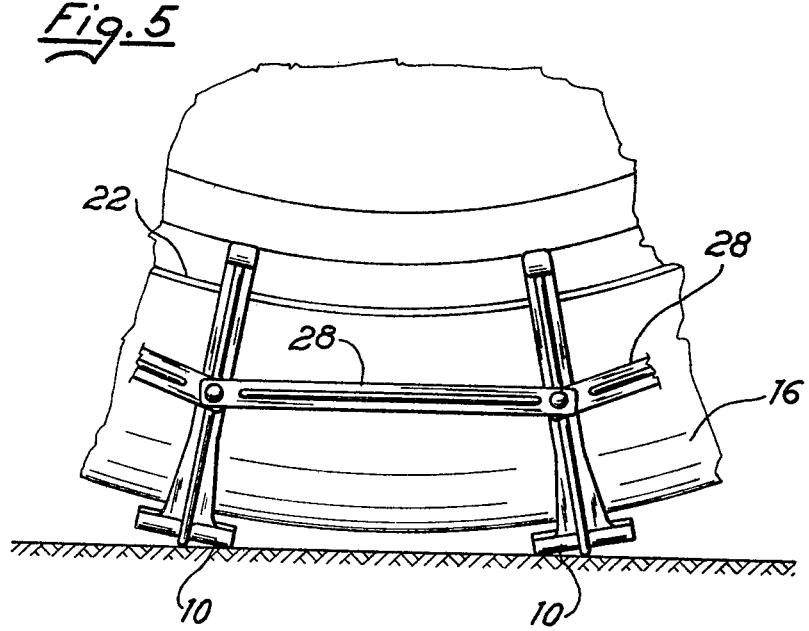

ANTI-SKID DEVICE FOR VEHICLE WHEELS

BACKGROUND OF THE INVENTION

1. Field of the Invention

This invention relates to a device adapted to avoid or at least reduce the vehicle wheel skid when driving on snow or like grounds, said device being able to be removably fastened in particular to the drive wheels of vehicles or the like. More precisely the device according to this invention allows to obtain a new and better usefulness and comfort in particular with reference to the fastening operation of the device to vehicle wheels.

2. Description of the Prior Art

As it is well known, in order to improve the drive conditions on roads with snow, ice, mud or the like, many devices have been proposed, comprising particular tires with nails or suitable treads as well as well known "skid chains" that are mounted and fastened to usual tires, of the type for driving on asphalted roads. Such "skid chains" are well known to all car drivers, together with the main drawbacks thereof, relating to great difficulties for fastening the same to the tires. In fact, these skid chains must be mounted on the tire and then stretched until attaining a complete adhesion thereto and minimizing the clearances in order to obtain a good drive and avoid that the chains strike against adjacent car body portions during the rotation thereof. The skid chain fastening operation is always difficult and usually requires the car to be lifted by jacks and the operator to join particularly dirty zones.

SUMMARY OF THE INVENTION

This invention provides for a new and improved type of anti-skid device that affects the vehicle drive substantially in the same manner as the known skid chains but can be mounted and fastened to the wheels in a particular fast and easy way, without necessity of lifting the vehicle and risk of having the operator hands dirty.

According to one embodiment of this invention, said anti-skid device is mainly characterized in that it is formed by a plurality of essentially monodimensional and substantially U-shaped rigid elements, having sizes and shape corresponding to the tire cross-section, as well as having resiliently spreadable arms with shaped ends adapted to be snap fitted on the tire rim, said elements being connected with one another by means of spacers adapted to define, between said U-shaped elements, a pitch always allowing that at least one of the same be in contact with the ground.

Accordingly, the device of this invention is no more made, as the known skid chains, of a foldable net that may be matched to the wheel shape, but of a plurality of single rigid elements, each of which is radially mounted on the tire and hooked to the tire rim so that the base thereof may exert the required anti-skid action on the ground.

According to another feature of this invention, said U-shaped elements are connected by means of rigid bars in such a manner that each element can freely rotate about connecting pins, between an horizontal or quite horizontal position and a vertical one, this latter position corresponding to an inserting and mounting position of the element on the wheel when the same element lies in the wheel bearing point on the ground. When the device components are suitably shaped, it is possible to put the device on the ground and mount the same on the wheel by simply advancing said wheel and then the vehicle, on the device. The load acting on each U-element causes a turnover thereof until reaching its mounting position on the tire. This position is ensured, when each element is under load, by the same shape of the element, which shows in the middle portion of its base a curvature with convexity toward the element inner zone, so that the wheel load on the element causes a resilient deformation thereof with stress of its arms toward each other and then toward the element hooking position on the tire rim.

BRIEF DESCRIPTION OF THE DRAWINGS

FIG. 4 is a side view of a device, during the mounting operation thereof on a vehicle tire.

FIG. 5 is a partial side view, corresponding to that of FIG. 4 and showing the device when wholly mounted.

DESCRIPTION OF THE PREFERRED EMBODIMENT

Figure 1:
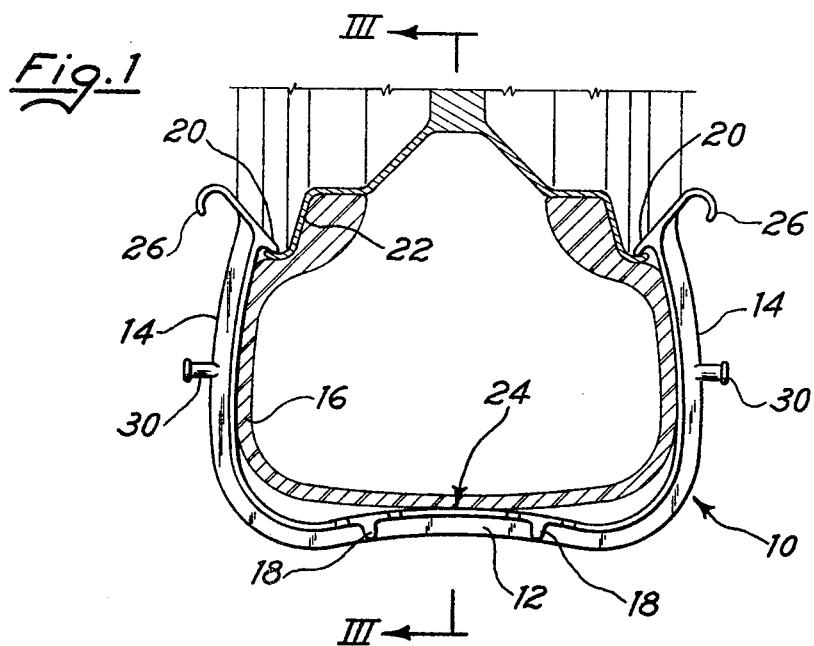
FIG. 1 is a front view showing one of the U-shaped elements of an anti-skid device, when mounted on a vehicle wheel.
Figure 2:
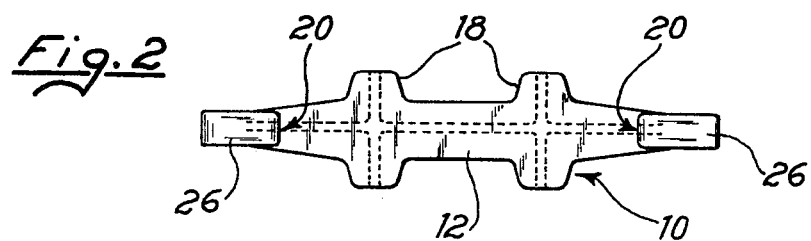
FIG. 2 is a top view of the same element.

With reference to the drawings and firstly to FIGS. 1 and 2, the shown device is essentially formed by a plurality of substantially monodimensional and rigid single elements 10 adapted to be mounted on the tires of vehicle drive wheels in a radial position and with hooking thereof on the tire rim, said elements being spaced by a given pitch so selected to always have at least one element contacting the ground. FIG. 1 shows one of such elements, preferably made in a plastics material and with a U-shape having a base part 12 and two symmetric arms 14 so shaped to match with the cross-section of the vehicle tire 16. Said elements 10 can carry suitable reinforcing ribs as well as strong projections 18 on their base 12 for a better transmission of the stresses to the ground. The ends of arms 14 shows teeth 20 adapted to be snap-fitted on the tire rim 22 and then retain the element in its operative position during the vehicle drive.

As it can be seen in FIG. 1, the base 12 of each U-shaped element 10 shows a middle portion lightly curved with its convexity turned toward the element inner zone, in order to improve the hooking conditions of each element when the same is more stressed, i.e. when it lies at the wheel lower position, bearing on the ground. In fact, the load acting on the ground through the wheel mainly operates in the middle portion of said curve and has a resultant substantially acting on the point 24. Due to the shape and resiliency of element 10 said resultant force at point 24 causes a stress of the arms in a reciprocal approaching direction so to improve the hooking conditions to the tire rim 22 and warrant each element 10 to maintain its operating position on the tire even when under stress. As shown in FIG. 1 said arms 14 show at their upper end suitably shaped projections 26 toward the outside, adapted to be handled in order to resiliently spread apart arms 14 and disconnect each element 10 from its operating position on the tire, of course when such element 10 is not under load.

Figure 3:
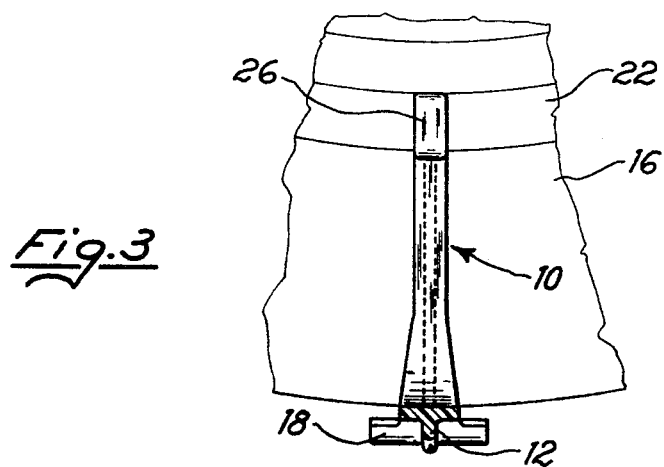
FIG. 3 is a cross-section along the line III—III of FIG. 1.

FIG. 3 shows a cross-section of element 10 along the line III—III of FIG. 1, wherefrom the ribs and reinforcing portion 18 of element 10 can be seen.

The anti-skid device according to this invention comprises a plurality of U-shaped elements 10 as previously shown, which are radially mounted on the vehicle tire according to a pre-set pitch as defined by connecting members 28 (FIGS. 4 and 5). Said connecting members are in the form of rigid rods pivotally connected to the arms 14 of each element 10. Preferably, each arm shows a pin-projection 30 with an end head, whereon corresponding openings at the ends of each connecting rod 28 are forcedly inserted. Of course, each U-shaped element 10 is connected by pairs of rods 28 both with the preceding and the following ones, with exception of the first and last U-elements that can be hooked with one another by handle means, while this hooking has been not revealed as strictly necessary.

Accordingly, the anti-skid device of this invention shows a first great advantage in that each U-shaped element operates independently from the other ones and in that such elements are detachably connected in order to allow an easy and cheap substitution of a single element 10, when broken, without necessity of substituting the whole device.

Further, the mounting and detaching operations of said U-elements 10 may be carried-out without any necessity of hooking the first and last element together, and then without any necessity to join dirty and difficult tire zones.

According to another feature of this invention, it is possible to mount and fasten the device on a tire without any hand intervention, by simply arranging the device on the ground and advancing thereon with the wheel on which the device must be mounted. In order to allow the above, the U-shaped elements 10 and rods 28 show projections adapted for a mutual support and acting in such a manner that when the device is straight laid on the ground, for instance as shown in FIG. 4, said U-shaped elements 10 are retained in a position slightly slanting with reference to the ground, so that the advancing tire 16 may act with its load on one edge of the base 12 of each element 10 in order to turn over the same element until reaching a tire radial position and hooking the arms 14 thereof to the tire rim 22. Of course, the above result could be attained also when the U-shaped elements 10 and rods 28 are so connected to allow for a wholly flat arrangement of the elements 10 on the ground, but in this case the element base 12 should show a shape adapted to cause the above element to turn over under the advancing tire load.

Accordingly and as it has been actually proved, the mounting operation of said anti-skid device on tire 16 of a vehicle wheel is very easy and fast, and it may be carried out by any driver without necessity to have his hands dirty or to lift the vehicle. It is simply necessary to put the device straight and flat on the ground with U-elements 10 as shown in FIG. 4, in front on the vehicle wheel, and then advance the vehicle on the device, until making at least a full wheel revolution. The device is then automatically mounted and the vehicle drive may continue without necessity of further operations. It is to be understood that many changes and modifications may be made to the shown embodiment without departing from the spirit and scope of the invention.

I claim:

1. An anti-skid device comprising a plurality of U-shaped elements including a pair of resilient spreadable arms for engagement with a wheel of a vehicle to provide anti-skid characteristics, and
   rigid spacer means pivotally connecting pairs of said U-shaped elements at predetermined and fixed intervals such that said elements can rotate from a first position where said arms are substantially parallel to said spacer means to a second position where said arms are substantially perpendicular to said first position and such that said elements define a pre-set pitch when the device is mounted on said wheel,
   said arms having a shape and size and said elements being connected to said spacer means so as to allow said device to be mounted on said wheel of said vehicle by moving said tire such that the wheel passes between said arms of said U-shaped elements.

2. An anti-skid device according to claim 1, wherein said arms include ends shaped for snap-fitting with the wheel of said vehicle.

3. An anti-skid device according to claim 1, wherein said spacer means are spacer rods pivotally connected to said arms at a point substantially in the center of said arms.

4. A device according to claim 1, wherein said spacer means are in the form of rods pivotally connected to the arms of adjacent elements.

5. A device according to claim 1 or 4, wherein said U-shaped elements and spacer means have support projections adapted to maintain said U-shaped elements slanting to the ground when the device is put straight on the ground, said U-shaped elements having a base with one or more projections in a direction substantially perpendicular to the element plane.

6. A device according to claim 1 or 4, wherein the pivot connection between U-shaped elements and spacer means allows the whole device and U-shaped elements to be arranged substantially flat on the ground, and wherein each of said U-shaped elements has a base with at least one tire support zones forming an angle with the U-shaped element plane.

7. A device according to claim 1 or 4, wherein said U-shaped elements have an arc-shaped base with its convexity toward the U inner space, so as to cause, under load, a mutual approach stress of the element arms.

8. A device according to claim 1 or 4, wherein said U-shaped element arms carry hand gripping projections at their outer ends.

9. A device according to claim 4, wherein said pivot connection between spacer means and U-shaped element rods comprises snap connections of projections and holes.

10. A device according to claim 1 or 4, wherein said U-shaped elements and spacer means are of a plastic material.

* * * * *